United States Patent
Sanguineti et al.

(10) Patent No.: US 10,035,107 B2
(45) Date of Patent: Jul. 31, 2018

(54) COMPOSITE MEMBRANE COMPRISING LAYER OF PERFLUOROPOLYETHER ON HYDROPHILIC SUBSTRATE

(71) Applicant: SOLVAY SPECIALTY POLYMERS ITALY S.P.A., Bollate (IT)

(72) Inventors: Aldo Sanguineti, Milan (IT); Emanuele Di Nicolo, Paderno Dugnano (IT); Pasquale Campanelli, Calimera (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 358 days.

(21) Appl. No.: 14/398,035

(22) PCT Filed: Apr. 29, 2013

(86) PCT No.: PCT/EP2013/058832
§ 371 (c)(1),
(2) Date: Oct. 30, 2014

(87) PCT Pub. No.: WO2013/164287
PCT Pub. Date: Nov. 7, 2013

(65) Prior Publication Data
US 2015/0129496 A1    May 14, 2015

(30) Foreign Application Priority Data
May 2, 2012 (EP) .................... 12166385

(51) Int. Cl.
| | |
|---|---|
| B01D 69/12 | (2006.01) |
| B01D 67/00 | (2006.01) |
| B01D 61/36 | (2006.01) |
| B01D 71/32 | (2006.01) |
| B01D 69/02 | (2006.01) |

(52) U.S. Cl.
CPC .......... *B01D 69/12* (2013.01); *B01D 61/364* (2013.01); *B01D 67/0002* (2013.01); *B01D 67/0006* (2013.01); *B01D 69/02* (2013.01); *B01D 69/125* (2013.01); *B01D 71/32* (2013.01); *B01D 2323/30* (2013.01); *B01D 2323/345* (2013.01); *B01D 2325/36* (2013.01); *B01D 2325/38* (2013.01)

(58) Field of Classification Search
None
See application file for complete search history.

(56) References Cited

U.S. PATENT DOCUMENTS

| | | |
|---|---|---|
| 4,265,713 A | 5/1981 | Cheng |
| 6,160,030 A | 12/2000 | Chaouk et al. |
| 2006/0076294 A1 | 4/2006 | Sirkar et al. |
| 2009/0028910 A1 | 1/2009 | Desimone et al. |
| 2009/0216104 A1 | 8/2009 | Desimone et al. |

OTHER PUBLICATIONS

Qtaishat M. et al., "Guidelines for preparation of higher flux hydrophobic/hydrophilic composite membranes for membrane distillation", Journal of Membrane Science, 2009, vol. 329, pp. 193-200.
Bonyadi S. et al., "Flux enhancement in membrane distillation by fabrication of dual layer hydrophilic-hydrophobic hollow fiber membranes", Journal of Membrane Science, 2007, vol. 306, pp. 134-146.
Garcia-Payo M.C. et al., "Wetting Study of Hydrophobic Membranes via Liquid Entry Pressure Measurements with Aqueous Alcohol Solutions", Journal of Colloid and Interface Science, 2000, vol. 230, pp. 420-431.
Broughton J. et al., "Porous cellular ceramic membranes: a stochastic model to describe the structure of an anodic oxide membrane", Journal of Membrane Science, 1995, vol. 106, pp. 89-101.
Smolders K. et al., "Terminology for Membrane Distillation", Desalination, 1989, vol. 72, pp. 249-262.
Criscuoli A., "Evaluation of energy requirements in membrane distillation", Chemical Engineering and Processing, 2008, vol. 47, No. 7, pp. 1098-1105.

*Primary Examiner* — Krishnan S Menon

(57) ABSTRACT

The invention relates to a composite comprising a porous substrate at least partially coated with a coating layer prepared from curing a coating composition (C), the coating composition (C) comprising at least one curable perfluoropolyether (PFPE) polymer. The invention further relates to a process for manufacturing a composite as afore-described, comprising the steps of: (a) providing a coating composition (C) comprising at least one curable perfluoropolyether (PFPE) polymer; (b) depositing said coating composition (C) on a porous substrate; and (c) crosslinking said coating composition (C) to form a porous substrate at least partially coated.

16 Claims, No Drawings

COMPOSITE MEMBRANE COMPRISING LAYER OF PERFLUOROPOLYETHER ON HYDROPHILIC SUBSTRATE

CROSS-REFERENCE TO RELATED APPLICATION

This application is a U.S. national stage entry under 35 U.S.C. § 371 of International Application No. PCT/EP2013/058832 filed Apr. 29, 2013, which claims priority to European application No. 12166385.0 filed on May 2, 2012. The entire contents of these applications are explicitly incorporated herein by this reference. Should the disclosure of any patents, patent applications, and publications which are incorporated herein by reference conflict with the description of the present application to the extent that it may render a term unclear, the present description shall take precedence.

TECHNICAL FIELD

The present invention relates generally to a composite comprising a porous substrate at least partially coated with a hydrophobic coating layer, a process for manufacturing the same, and the use thereof for producing a porous filtration membrane. Specifically, the present invention pertains to a composite membrane with two layers of different hydrophilicity, a coating process for making the same, and the use of said composite membrane or coating process in water treatment applications such as membrane distillation.

BACKGROUND ART

Membrane distillation (MD) is a thermally driven separation process used in water treatment. Main applications of MD include notably water desalination, reverse osmosis process, and removal of organic matter in drinking water production. In a typical MD process, a temperature gradient is first applied between two opposing sides of a porous hydrophobic membrane, thus forming a "hot side" and a "cooling side" of the membrane. Subsequently, a liquid feed from sea water or other non-potable water sources is heated at the hot side of the membrane, and the porous membrane functions as a physical support and a liquid barrier to keep the hot fluids from entering the cooling side while allowing the vapour generated from the hot fluids to migrate to the cooling side. The cooling side of the membrane can contain either a liquid or a gas to collect and condense the migrated vapour molecules. In a commonly used MD configuration, Direct Contact Membrane Distillation (DCMD), a hot saline feed is separated from a cold liquid flow at the cooling side by the porous membrane.

In order for a vapour-permeable membrane to properly function as a robust liquid barrier in the MD application, it is essential to have a high surface hydrophobicity at least on the fluid-contacting side of the membrane. For this reason, the hydrophobic porous membranes used for microfiltration or ultrafiltration process have been conveniently applied in the MD process.

A variety of hydrophobic materials have been used to construct the porous membrane for MD in academic research and some commercial equipments, including Polypropylene (PP), Poly(vinylidene fluoride) (PVDF) and Polytetrafluoroethylene (PTFE), either in flat sheet or hollow fiber configuration. However, the composition of these existing hydrophobic membranes is not optimized for the MD application. Particularly, on one hand, a MD membrane formed of the aforementioned hydrophobic materials must be made relatively thick: not only to provide the necessary mechanical support but also to function as an effective heat conduction barrier in the thermally driven MD process. On the other hand, in order to maximize the water vapour flux across the MD membrane (i.e. the measure of MD process productivity), it is highly desirable to minimize the thickness of the MD membrane.

Recently, as an attempt to solve the aforementioned dilemma, several types of thin film composite (TFC) membranes were tested in the aforementioned DCMD configuration, each made of two layers: one thin hydrophobic layer attached to one thicker hydrophilic sub-layer as described in QTAISHAT, M., et al. Guidelines for preparation of higher flux hydrophobic/hydrophilic composite membranes for membrane distillation. *Journal of Membrane Science*. 2009, vol. 329, p. 193-200. and BONYADI, S., et al. Flux enhancement in membrane distillation by fabrication of dual layer hydrophilic-hydrophobic hollow fiber membranes. *Journal of Membrane Science*. 2007, vol. 306, p. 134-146. In use, the thin hydrophobic layer in said TFC membrane directly contacts the feed fluid in DCMD and withholds liquid from the pores, while the hydrophilic sub-layer provides the necessary physical support and functions as an effective thermal barrier between the two membrane sides. Both the reduced thickness of the hydrophobic layer and the increased pore hydrophilicity in such a TFC membrane desirably reduce the vapour flux resistance and mitigate temperature polarization effects.

Additionally, the use of a fluoropolymer coating to increase the surface hydrophobicity of a MD membranes has been disclosed in US 2006/0076294 A (KAMALESH K. SIRKAR, BAOAN LI,) Apr. 13, 2006. In this application, the hydrophobic coating is applied to a porous membrane using plasma polymerization or solution deposition methods to further decrease membrane pores wetting. However, no details of the coating preparation were reported in this application. Plasma polymerization is generally recognized as a complex method to apply in membrane manufacturing and thus has limited industrial application. Solution coating can be simpler in practice, but does not generate strong chemical bonding between the fluoropolymer coating and the supporting membrane. As a mere physical adhesion of fluoropolymer coating with other surfaces is known to be extremely poor, the durability of a fluoropolymer coating made by solution coating according to US 2006/0076294 is expected to be undesirably low.

Thus, there is a need in the art for hydrophobic/hydrophilic composite membrane which can be easily manufactured and still provides outstanding thermal stability and physical durability properties.

SUMMARY OF INVENTION

The foregoing shortcomings and disadvantages of the prior art composite membranes are alleviated by the present invention that provides a composite comprising a porous substrate at least partially coated with a coating layer prepared from curing a coating composition (C), the coating composition (C) comprising at least one curable perfluoropolyether (PFPE) polymer.

The term "curable", as used herein and in connection with a polymer composition, means that the indicated polymer composition is crosslinkable through functional groups, preferably by UV radiation or thermal treatment.

The Applicant has found that the above-described composite of the present invention can be advantageously used as a composite membrane having two layers of different hydrophilicity, which provides a liquid-repelling coating layer to resist undesired liquid penetration and essentially maintains the same porosity and gas/vapour permeability of the un-coated porous substrate, thereby minimizing the membrane resistance to vapour transfer.

For the purpose of the present invention, the term "porous substrate" refers to a substrate having a plurality of pores or throughbores that permit gas or vapour molecules to pass across the substrate, wherein the substrate may take the form of a membrane.

According to one embodiment of the composite of the present invention, the porous substrate is a porous membrane. As used herein, the term "porous membrane" refers to a membrane having a plurality of pores or throughbores that permit gas or vapour molecules to pass across the membrane, including but not limited to the porous membranes used in a MD process.

According to one embodiment of the composite of the present invention, the original, un-coated porous substrate is a porous membrane having a nominal pore size in a range of 0.02 μm to 1 μm, preferably between 0.1 μm to 0.5 μm. According to one embodiment of the present invention, the composite has a nominal pore size in a range of 0.01 μm to 1 μm, preferably 0.1 μm to 0.5 μm.

According to one embodiment of the composite of the present invention, the original, un-coated porous substrate is a porous membrane having a porosity of 0.40 to 0.99, preferably 0.70 to 0.90. According to one embodiment of the present invention, the composite has a porosity of 0.40 to 0.99, preferably 0.60 to 0.90. "Porosity", as used herein, refers to the volume of the pores divided by the total volume of the porous substrate.

The term "partially coated", as used in relation to a porous substrate in the present invention, means that the coating on the porous substrate may not be completely contiguous around all surfaces of the porous substrate, i.e. there may still be portions of the external surfaces or pore surfaces that are not coated. Therefore, the term "at least partially coated" as used in the present invention covers the situations where: (i) all surfaces of the porous substrate are fully coated; (ii) some surfaces of the porous substrate are fully coated while others are partially coated, or not coated; and (iii) all surfaces of the porous substrate are partially coated.

According to an embodiment of the invention, the composite comprises an at least partially coated porous membrane having a thickness of at least 15 μm; according to another embodiment said thickness is at least 20 μm, while in still another embodiment it is of at least 25 μm. According to an embodiment of the invention, the composite comprises an at least partially coated porous membrane having a thickness of at most 250 μm; according to another embodiment said thickness is at most 200 μm, while in still another embodiment it is of at most 150 μm.

The porous membrane of the present invention can be made from a wide range of inorganic (e.g. metals, ceramics etc.), organic (e.g. polymeric), and composite materials. Preferably, the material for making the porous membrane of the present invention is a hydrophilic material. As used herein, the term "hydrophilic material" refers to a material having a contact angle with water of 90 degree or less when the material is shaped into a flat plate. Typical examples of the hydrophilic material used in the porous substrate of the present invention include cellulose and cellulose derivatives, e.g. cellulose acetate and regenerated cellulose; polyamides, polyimides; polyamide-imides; hydrophilic modified polyvinylidene fluoride; polysulphone and polyether sulfone, as well as their hydrophilic modifications.

According to one preferred embodiment of the composite of the present invention, the coating composition (C) further comprises at least one crosslinking initiator.

According to a particular embodiment of the present invention, the at least one curable PFPE polymer in the coating composition (C) comprises at least one functional perfluoropolyether compound [compound (E)], said compound (E) comprising a (per)fluoropolyalkylene chain [chain ($R_f$)], and at least one unsaturated moiety, and said compound (E) being present in an amount in the range of 5% to 100% wt with respect to the coating composition (C), preferably in the range of 25% to 100% wt, and more preferably in the range of 60% to 99%.

In addition, the Applicant has found that by appropriate selection of the molecular weight of the chain $R_f$ of the compound (E) it is possible to obtain coating layers which possess particularly advantageous mechanical properties. It has thus been found that, in the crosslinkable coating composition (C) used in the present invention, the molecular weight of the chain $R_f$ may be comprised between 500 and 4000. According to an embodiment of the invention, said molecular weight is comprised between 1200 and 3000. According to another embodiment, said molecular weight is comprised between 1500 and 2500.

The term "(per)fluoropolyoxyalkylene chain (chain $R_f$)" is hereby intended to denote a chain comprising recurring units (R1), said recurring units having general formula: —$(CF_2)_k$—CFZ—O—, wherein k is an integer of from 0 to 3 and Z is selected between a fluorine atom and a $C_1$-$C_5$ perfluoro(oxy)alkyl group.

Chain $R_f$ preferably complies with formula:

wherein Y is a $C_1$-$C_5$ perfluoro(oxy)alkyl group, z is 1 or 2; and p, q, r, s, t are integers≥0, which may be selected such that the molecular weight of said chain $R_f$ complies with above mentioned requirements.

According to an embodiment of the invention, chain $R_f$ complies with formula: —$(CF_2O)_{p'}(CF_2CF_2O)_{q'}$—, wherein p' and q' are integers≥0, selected such that the molecular weight of said chain $R_f$ complies with above mentioned requirements. Specifically, the molecular weight of said chain $R_f$ may be in the range between 1200 and 3500; according to a particular embodiment it may be between 1200 and 3000, according to another embodiment between 1500 and 3000, according to still another embodiment between 1500 and 2500; it is thus understood that in corresponding embodiments as above detailed p, q, r, s, t, p' and q' represent integers selected so as to comply with these molecular weight requirements.

Unsaturated moieties of the compound (E) are not particularly restricted provided that they possess a suitable reactivity in curing conditions.

Compound (E) may be selected among those of formula:

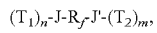

wherein $R_f$ represents a chain $R_f$ as above detailed; J and J', equal to or different from each other, are independently a bond or a divalent, trivalent or tetravalent bonding group; n, m are integers from 1 to 3; and $T_1$ and $T_2$, equal to or different from each other, are selected from the group consisting of:

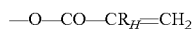

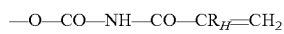

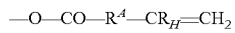

wherein $R_H$ is H or a $C_1$-$C_6$ alkyl group; $R^A$ is selected from the group consisting of:

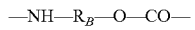

(jj) 

$R_B$, $R_{B'}$, equal or different from each other, being independently divalent, polyvalent (e.g. trivalent or tetravalent) bonding groups selected from the group consisting of $C_1$-$C_{20}$ aliphatic group, $C_5$-$C_{40}$ cycloaliphatic group, $C_6$-$C_{50}$ aromatic, alkylaromatic or heteroaromatic group.

Groups J and J' can be any straight or branched organic bonding group. According to an embodiment, such groups are selected among divalent, trivalent or tetravalent (fluoro) hydrocarbon ether groups having 1 to 10 carbon atoms; or 1 to 6 carbon atoms according to a more specific embodiment. The presence of a bonding group having a valency of 3 or 4 results in a branched compound (E), having 3 to 6 terminal groups $T_1$ and $T_2$ and a corresponding number or reactive sites for the curing reaction.

Among compounds (E), mention can be made of:
(1) acrylate derivatives of formula:

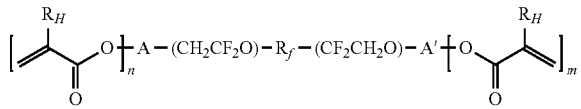

wherein n and m are integers from 1 to 3; A and A', equal or different from each other, are independently a bond or a divalent, trivalent or tetravalent bonding group; $R_f$ represents a chain as above detailed and $R_H$, $R_{H'}$, equal or different from each other, are independently H or a $C_1$-$C_6$ alkyl group;

(2) acrylamide-urea derivatives of formula:

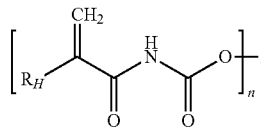

wherein n and m, A and A', $R_f$, $R_H$, $R_{H'}$ and $R_f$ have the same meaning as above detailed;

(3) acrylate-urethane derivatives of formula:

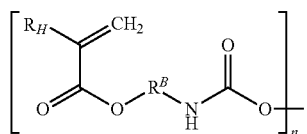 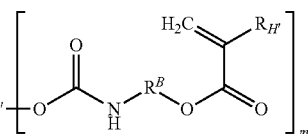

wherein n and m, A and A', $R_f$, $R_H$, $R_{H'}$ have the same meaning as above detailed; and each of $R^B$, equal to or different from each other, is a divalent, trivalent or tetravalent group selected from the group consisting of $C_1$-$C_{20}$ aliphatic group, $C_5$-$C_{40}$ cycloaliphatic group, $C_6$-$C_{50}$ aromatic, alkylaromatic or heteroaromatic group;

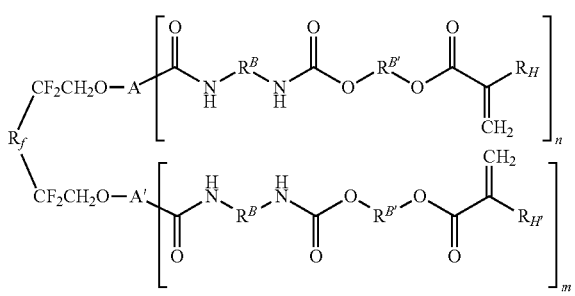

wherein n and m, A and A', $R_f$, $R_H$, $R_{H'}$, $R^B$ have the same meaning as above detailed; and each of $R^{B'}$, equal to or different from each other, is a divalent, trivalent or tetravalent group selected from the group consisting of $C_1$-$C_{20}$ aliphatic group, $C_5$-$C_{40}$ cycloaliphatic group, $C_6$-$C_{50}$ aromatic, alkylaromatic or heteroaromatic group.

Non limitative examples of compounds (E) which have been found particularly useful to the purposes of the present invention are notably:

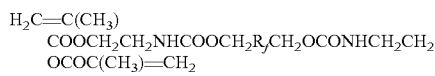

wherein $R_f$ is a —$CF_2O(CF_2CF_2O)_p(CF_2O)_qCF_2$— chain,

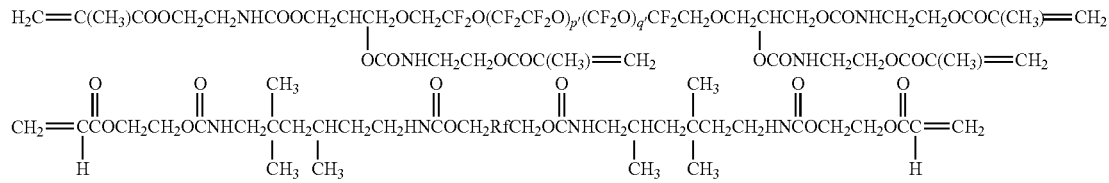

wherein Rf is a —$CF_2O(CF_2CF_2O)_p(CF_2O)_qCF_2$— chain,

wherein:

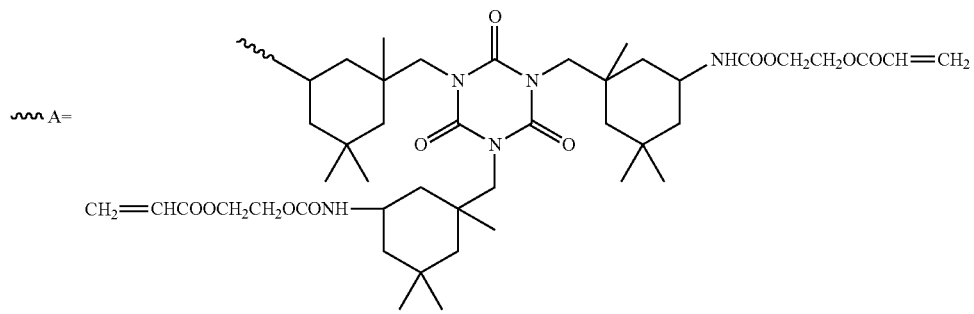

and p' and q' are selected so that the molecular weight of said chain $R_f$ is more than 500 and less than 4000, preferably is comprised between 1200 and 3000, more preferably between 1500 and 2500.

The Applicant has found that a coating layer formed by curing a coating composition (C) comprising at least one perfluoropolyether compound as aforementioned advantageously possesses a good transparency, good chemical and oxidative resistance, liquid (water) barrier property, and a good adhesion to different porous substrates, as well as excellent mechanical properties which ensure an immunity to practically all deterioration of the coating layer under severe stress. Particularly, once formed on a porous membrane, the coating layer formed by curing said coating composition (C) is found to exhibit high hydrophobicity (as demonstrated by a contact angle close to or larger than 120 degree), regardless of the original surface hydrophobicity of the un-coated porous membrane.

According to another particular embodiment of the present invention, the coating composition (C) not only comprises the at least one functional perfluoropolyether compound [compound (E)] as aforedescribed, but also at least one nonfluorinated compound [compound (M)] crosslinkable with said perfluoropolyether compound (E), wherein said nonfluorinated compound (M) has at least one unsaturated moiety, provided that said compound (M) has at least two unsaturated moieties if the compound (E) has one unsaturated moiety.

If compound (M) is present, compound (E) is used in the coating composition (C) in an amount of 10% to 95% wt, with respect to coating composition (C). According to a specific embodiment of the invention, said amount is comprised between 20% and 85% wt, preferably between 30% and 75% wt, with respect to coating composition (C).

Compound (M) may comprise a wide variety of monomers or oligomers which are co-curable with compound (E).

The co-curable compound (M) may have one, two or more polymerisable ethylenically unsaturated bonds which are capable of polymerisation. Typically, said compound (M) may comprise one or more of (meth)acryloyl functions. In the present description and in the claims, (meth)acryloyl function is intended to indicate a methacryloyl function or an acryloyl function.

Compound (M) may be for example selected among nonfluorinated compounds bearing the functional moiety represented in the following formula:

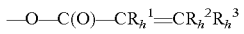

wherein $R_h^1$, $R_h^2$ and $R_h^3$ are nonfluorinated $C_1$-$C_{10}$ aliphatic group, aliphatic $C_1$-$C_{10}$ silane group, $C_5$-$C_{14}$ cycloaliphatic group, $C_5$-$C_{14}$ cycloaliphatic silane group, $C_6$-$C_{14}$ aromatic or alkylaromatic group. Monofunctional, difunctional, tri- or multifunctional derivatives can be used, although it must be noted that, in order to ensure a suitable grade of cross-linking between compound (E) and compound (M), it is necessary that compound (M) comprises at least two unsaturated moieties if compound (E) has only one unsaturated moiety.

Representative examples of compound (M) may be the monofunctional (meth)acrylates selected from: (3-methacryloxypropyl)trimethoxysilane, (3-methacryloxypropyl)dimethylmethoxy silane, (3-acryloxypropyl)-trimethoxysilane, 2-hydroxyethyl-(meth)acrylate, 2-hydroxypropyl-(meth)acrylate, 2-hydroxybutyl-(meth)acrylate, 1-hydroxybutyl-(meth)acrylate, 2-hydroxy-3-phenyloxy-propyl(meth)acrylate, tetrahydro-furfuryl-(meth)acrylate, isodecyl-(meth)acrylate, 2-(2-ethoxyethoxy)-ethyl-(meth)acrylate, stearyl(meth)acrylate, lauryl(meth)acrylate, 2-phenoxyethyl(meth)acrylate, isobornyl(meth)acrylate, tridecyl (meth)acrylate, polycarprolactone(meth)acrylate, phenoxytetraethyleneglycol-(meth)acrylate and imide-acrylate.

The difunctional (meth)acrylate which can be employed as compound (M) in the present invention may be ethoxylated-nonylphenol(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, 1,3-butylene glycol di(meth)acrylate, tripropylene glycol di(meth)acrylate, ethoxylated bisphenol A di(meth)acrylate, and cyclohexane dimethanol di(meth)acrylate.

Examples of the tri- or multi-functional (meth)acrylate which may be employed as compound (M) in the present invention are tris[2-(acryloyloxy)ethyl]isocyanurate, trimethylol propane triacrylate, ethylene oxide added trimethylol propane triacrylate, pentaerythritol triacrylate, tris(acrylooxyethyl)isocyanurate, dipentaerythritol hexaacrylate and caprolactone denatured dipentaerythritol hexaacrylate.

Good results have been obtained for the present invention with the following compounds (M): 1,6-esandiol diacrylate, trimethylolpropane tri(meth)acrylate, tripropylene glycol di(meth)acrylate, tetrahydrofurfuryl (meth)acrylate, 3-(meth)acryloxypropyl trimethoxysilane, acrylic acid, dipentaerithrol hexaacrylate.

As mentioned earlier, the coating composition (C) useable for obtaining the coating layer of the composite invention also preferably contains a crosslinking initiator. The crosslinking initiator may be a photoinitiator or a thermal initiator such as an organic peroxide. Preferably, the crosslinking initiator is a photoinitiator selected in the group consisting of following families: alpha-hydroxyketones; phenylglyoxylates; benzyldimethyl-ketals; alpha-aminoketones; and bis acyl-phosphines.

Among alpha-hydroxyketones, mention can be made of 1-hydroxy-cyclohexyl-phenyl-ketone; 2-hydroxy-2-methyl-1-phenyl-1-propanone; and 2-hydroxy-1-[4-(2-hydroxyethoxy)phenyl]-2-methyl-1-propanone.

Among phenylglyoxylates, mention can be made of methylbenzoylformate; oxy-phenyl-acetic acid 2-[2-oxo-2-phenyl-acetoxy-ethoxy]-ethyl ester, and oxy-phenyl-acetic 2-[2-hydroxy-ethoxy]-ethyl ester.

As benzyldimethyl-ketals, alpha, alpha-dimethoxy-alpha-phenylacetophenone can be mentioned.

Among alpha-aminoketones, mention can be made of 2-benzyl-2-(dimethylamino)-1-[4-(4-morpholinyl)phenyl]-1-butanone, and 2-methyl-1-[4-(methylthio)phenyl]-2-(4-morpholinyl)-1-propanone;

Among bis acyl-phosphines, mention can be made of diphenyl-(2,4,6-trimethylbenzoyl)-phosphine oxide.

Among photoinitiators, those which are liquid at room temperature are preferred.

A class of photoinitiators which gave particularly good results has been that of alpha-hydroxyketones, in particular 2-hydroxy-2-methyl-1-phenyl-1-propanone.

The amount of photoionitiator is not particularly limited. Generally, it will be used in an amount included between 0.01% wt and 3% wt with respect to the weight of the coating composition (C). According to an embodiment of the invention, said amount may be in the range of 0.5% wt and 1% wt.

Also, since residues of the photoinitiator may impair the resulting polymer composition, it is generally preferred to minimize the amount thereof as much as possible. Thus, said photoinitiator is generally used in an amount of at most 10% wt, preferably at most 7.5% wt, more preferably at most 5% wt, with respect to the weight of the coating composition (C).

For the purpose of the present invention, coating composition (C) may comprise further additives and ingredients, provided that their presence does not inference with the crosslinking capability of the coating composition (C).

For instance, if the coating layer of the present composite invention is prepared from curing the coating composition (C) by radiation, light stabilizers such as HALS (Hindered Amine Light Stabilizers) and UV adsorbers can be added to the coating composition (C). Other optional additives in the coating composition (C) include leveling agents and adhesion promoters. The total amount of these additives, if present, is preferably comprised between 5% and 10% wt in the coating composition (C).

The Applicant has also found that adding fillers such as inorganic oxides e.g. silica, $TiO_2$, ITO (indium tin oxide) to the coating composition can improve adhesion of the cured coating layer to the porous substrate in the composite invention. Typically, primary particles of the fillers used in the composition (C) have an average size of less than 100 nm.

It is nevertheless generally understood that, in the coating composition (C) used for the present invention, components other than compound compound (E) and compound (M) are present in a minor amount, to the extent that they do not modify the crosslinking capability of the coating composition.

The present invention also relates to a process for manufacturing a composite comprising a porous substrate at least partially coated with a coating layer prepared from curing a coating composition (C), the coating composition (C) comprising at least one curable perfluoropolyether (PFPE) polymer. Said process comprises the steps of:

(a) providing a coating composition (C) comprising at least one curable perfluoropolyether (PFPE) polymer;

(b) depositing said coating composition (C) on a porous substrate; and (c) crosslinking said coating composition (C) to form a porous substrate at least partially coated.

The formulation of said coating composition (C) and the selection of porous substrate in the step (a) are the same as afore-described for the composite of the present invention.

In step (b), deposition of the coating composition (C) on a porous substrate may be accomplished by any appropriate deposition technique, including casting, spin-coating, extrusion moulding, and the like. According to a preferred embodiment of the process invention, the coating composition (C) is directly deposited on the surface of the porous substrate which is to be protected. According to another preferred embodiment of the process invention, the coating composition (C) is deposited on a porous membrane by impregnation at least part of the porous membrane into the coating composition (C).

In an embodiment of the present process invention, step (c) comprises submitting the coating composition (C) to UV radiation or heating the coating composition (C), to crosslink said PFPE polymer. Particularly, in the case that the porous substrate on which coating composition (C) has been deposited is submitted to UV radiation, a photoinitiator is usually used; and in the case that the porous substrate is heated for crosslinking, a thermal initiator is usually used, in the coating composition (C).

In a preferred embodiment of the process invention, step (c) includes irradiating the coating composition (C) with UV radiation in an amount sufficient to crosslink said PFPE polymer, in the case that the coating composition (C) is UV curable. For the purpose of the present application, "UV radiation" and "UV light" are used interchangeably and represent an electromagnetic radiation with a wavelength length of 100 to 400 nm. Suitable UV radiation wavelength are for instance UV-A (320 to 400 nm), UV-B (280 to 320 nm) and UV-C (200 to 280 nm), provided the wavelength matches with the absorbing wavelength of any photoinitiator included in the composition (C). In a preferred embodiment of the present invention, the UV radiation applied to the coating composition (C) has a wavelength of between 100 to 280 nm, more preferably from 200 to 270 nm. In an embodiment of the present invention, the UV radiation is applied to the coating composition (C) using an irradiation dose between 0.5 to 8 J/cm$^2$, preferably between 1 to 4 J/cm$^2$, more preferably between 1.5 to 3 J/cm$^2$.

Particularly, in step (c), UV light may be directly applied to only one side of the porous substrate that is deposited with a UV curable coating composition (C), in which case the other side(s) of the porous substrate is hindered from the UV radiation and therefore remains uncoated. As such, the present process can be easily used to prepare asymmetric porous membrane composite with a single hydrophobic surface. Alternatively, in step (c), UV light may be applied from the external surface of dry hollow fibers after impregnation of the same with a UV-curable coating composition (C), in which case the internal surface of the hollow fibers remain uncoated. In still another embodiment of the process invention, the UV light is applied to the totality of a wetted porous membrane, in which case the two external surfaces and the inner pore surface of the membrane are covered by a crosslinked hydrophobic coating.

Among sources of UV radiations which can be used, mention can be made of mercury lamps, xenon arc lamps (commonly used as sunlight simulators), deuterium arc lamps, mercury-xenon arc lamps, metal-halide arc lamps, and tungsten-halogen incandescent lamps.

Radiation dose will be adjusted by the skilled in the art as a function of the type and concentration of photoinitiator; generally, good results have been obtained with total radiation doses of at least 1 J/cm$^2$, preferably 5 J/cm$^2$.

For achieving improved curing rates and minimizing degradation reactions, coating composition (C) may be submitted to UV radiations under a substantially oxygen-free atmosphere. Optionally, step (c) may be carried out under nitrogen atmosphere.

The process according to the present invention may further comprise the step of: d) wash the coated porous substrate with a solvent to remove the un-crosslinked PFPE polymer. The solvent can be selected from partially fluorinated solvents, such as ketones, acetates, Novec® fluid HFE-7100 (from 3M) and the mixtures thereof.

The Applicant has found that, using the process of the present invention, a thin hydrophobic coating with high durability can be conveniently formed on a porous substrate (e.g. a porous membrane), thus providing a liquid (water) repelling surface which desirably preserves the vapour flux through the pores while retaining the mechanical/thermal barrier function of the otherwise un-coated porous substrate.

More specifically, the applicant has found that, using the process of the present invention, the surface of a porous membrane can be modified to have an increased resistance to liquid (water) penetration while keeping the same porosity and the same gas and vapour permeability of the original membrane. The applicant has also found that the present process invention could introduce a non-reversible surface wettability modification of the porous membrane, which is un-affected by repeated solvent wash or hot water treatment after curing step.

The invention also relates to a method for separating water from aqueous solutions of inorganic solutes, using the afore-described composite, wherein the composite comprises a composite membrane. Examples of said method include but not limited to MD process.

The invention further relates to a process to provide a hydrophobic coating to a porous filtration membrane. The porous filtration membrane may be used as the separation membrane in a MD process as above discussed, and any similar industrial/laboratory procedure as known in the art. Said process was found especially advantageous to provide a hydrophobic coating to a porous separation membrane in a MD process, as the hydrophobic coating thus formed exhibited excellent durability and satisfactory adhesion to the porous separation membrane.

The invention will be now described with reference to the following examples, whose purpose is merely illustrative and not intended to limit the scope of the invention.

EXAMPLES

Materials

Membrane 1: Polyethersulfone (PES) membrane 100H Thin from Pall with a nominal pore size of 0.1 micron, a porosity of about 0.74, a contact angle towards water of the top side of 67 degrees and of 84 degrees of the bottom side, a liquid entry pressure (L.E.P.) of 0.3 bar and a N2 flux of 0.43 L/(min cm2).

Membrane 2: Regenerated Cellulose (RC) membrane from Sartorius with a nominal pore size of 0.45 micron and a porosity of about 0.74, a drop penetration time of less than 5 sec on both sides, a L.E.P. of 0 bar and a N2 flux of 0.75 L/(min cm2).

Membrane 3: hydrophilic polyvinylidene fluoride (PVDF) membrane Durapore® GVWP 0.22 from Millipore with a nominal pore size of 0.22 micron, a porosity of about 0.65, a L.E.P. of 0 bar, a nitrogen flux of 0.39 L/(min cm2) and a drop penetration time of less than 5 sec on both membrane sides.

Fluorolink® MD 700 from Solvay Specialty Polymers is an oligo urethane methacrilate with a PFPE backbone whose Mw is about 1500.

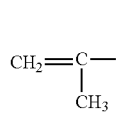 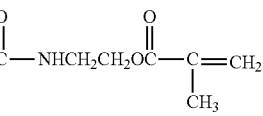

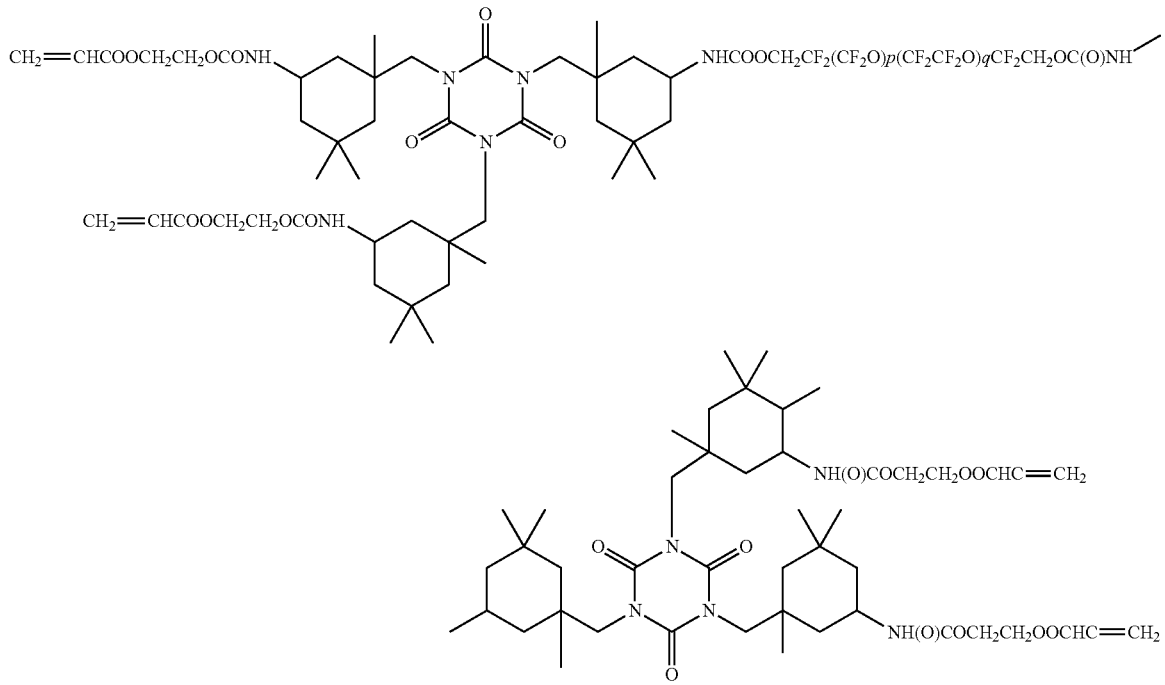

Fluorolink® AD 1700 from Solvay Specialty Polymers with a PFPE backbone whose Mw is about 4000.

Darocur® 1173 from Ciba is a liquid photoinitiator which is commonly used to initiate the photopolymerisation of chemically unsaturated acrylate.

Analytical Methods

Measurement of Contact Angle and of the Drop Penetration Time

For the purpose of the present invention, a material is considered hydrophobic, or non-wetted, when the contact angle of a water droplet on its surface is higher than 90°. The contact angle towards water was evaluated at 25° C. by a Dataphysics OCA 20, according to ASTM D 5725-99. Contact angle measurements were taken on virgin (i.e. un-treated) membranes and coated (i.e. UV cured) membranes using 2 μL water drops. In the case of highly hydrophilic membranes, however, the water contact angle cannot be measured because the water drop quickly penetrates into the membrane; in this case, a water penetration time is reported to evaluate the membrane hydrophilicity.

Measurement of Water Permeability

Water permeability of different membranes is measured according to the technique known in the art. The water permeability of tested membranes was measured with a dead-end stainless steel apparatus under an atmospheric pressure of 1 bar. The surface area of the membranes was about 11 cm².

Measurement of L.E.P.

Hydrophobic porous membranes do not allow water to pass until a pressure exceeding a certain minimum value is applied thereon. The liquid entry pressure (L.E.P.) used herein is defined as the minimum pressure that must be applied on the liquid before it penetrates into the pores and subsequently produce a flow. This L.E.P. value is related to the interfacial tension of the liquid, the surface energy of the material and the shape and size of the membranes pores.

It is worth noting that L.E.P. takes into account only "active pores" (pores which connect both sides of the membrane) since a liquid cannot pass through closed pores (or "inactive pores"). The experimental apparatus and the procedure to measure L.E.P. were identical to what described in GARCIA-PAYO, M. C., et al. Wetting Study of Hydrophobic Membranes via Liquid Entry Pressure Measurements with Aqueous Alcohol Solutions. *Journal of Colloid and Interface Science*. 2000, vol. 230, p. 420-431, and the measurement was carried on flat sheet (dry) membranes. The pressures applied during the measurements ranged from 0.1 to about 5.5 bar and the liquid used was Milli-Q water. In the case of hydrophilic membranes, a L.E.P of 0 bar was reported, indicating that the water spontaneously flows through the membrane.

Nitrogen Flux

The permeation flux of nitrogen through dry membranes was measured at a trans-membrane pressure of 0.12 bar, following the ASTM standard F316-70. This test allows the determination of membrane permeance under examination and from that it is possible to evaluate the decrease in gas and vapor transport induced by any surface coating. The procedure is well-known in the art and is described, for example, in BROUGHTON, J., et al. Porous cellular ceramic membranes: a stochastic model to describe the structure of an anodic oxide membrane. *Journal of Membrane Science*. 1995, vol. 106, p. 89-101.

Measurement of Porosity

Porosity of the membrane is defined as the volume of the pores divided by the total volume of the membrane. The porosities were measured using IPA (isopropyl alcohol) as wetting fluid according to the procedure described for example in SMOLDERS, K., et al. Terminology for Membrane Distillation. *Desalination.* 1989, vol. 72, p. 249-262. Specifically, this measurement method is relied on the fact that IPA penetrates into the pores of the membrane and water does not penetrate into the pores of the membrane.

Firstly, the density of the polymer material ($\rho_{pol}$) of the membrane was measured using the formula below:

$$\rho_{pol} = \frac{\rho_{IPA} \, wt.3}{wt.1 + wt.3 - wt.2}$$

wherein wt. 1=weight of the pyknometer with IPA; wt. 2=weight of the pyknometer with IPA and membrane; wt. 3=dry weight of the membrane. Secondly, in the same way, the density of the membrane ($\rho_m$) was calculated by the following formula:

$$\rho_m = \frac{\rho_w \, wt.3}{wt.1 + wt.3 - wt.2}$$

wherein wt. 1=weight of the pyknometer with water; wt. 2=weight of the pyknometer with water and membrane; wt. 3=dry weight of the membrane. Subsequently, the membrane porosity ($\varepsilon$) can be calculated by the formula below:

$$\varepsilon = 1 - \frac{\rho_m}{\rho_{pol}}$$

UV Irradiation

Membranes were cured by exposure to UV light from a Fusion system model VPS 1600 curing unit with variable power supply (240 watts/cm), H lamp 13 mm and variable focal distance. This unit is mounted on a variable speed conveyor (velocity from 10 to 60 m/min) and is able of delivering a dose of 0.28 J/cm² to 1.68 J/cm² in a single pass as measured with a UV process supply compact radiometer EIT PawerMap®.

FT-IR Analysis

The presence of the crosslinked Fluorolink® oligomers on the membrane surface was detected by the peaks of urethanes at 1694 cm⁻¹ and 1725 cm⁻¹ in the IR spectrum obtained in reflection.

Measurement of Direct Contact Membrane Distillation (DCMD) Flux

Water flux across the membrane in DCMD was measured according to a conventional technique known in the art. The apparatus used is described in A. CRISCUOLI. Evaluation of energy requirements in membrane distillation. *Chemical Engineering and Processing.* 2008, vol. 47, no. 7, p. 1098-1105.

Example 1

A piece of Membrane 1 was irradiated twice with UV light having a radiation energy of 1.68 J/cm². Then, the membrane was dipped in a Butyl acetate solution containing 5% w/w of Fluorolink® MD 700 and 0.1% w/w Darocur® 1173 for 2 minutes. After the impregnation, the membrane was removed from the solution and held horizontally to be dried in a fume hood for 12 hours. Then, the upper side was again UV irradiated with a total radiation energy of 1.68 J/cm². Finally, it was washed for three times, each time with 100 ml of Butyl acetate to wash out the un-reacted Fluorolink® material from the membrane, and thereby obtaining a composite product (or more specifically, a composite membrane).

FT-IR spectroscopic analyses of the composite membrane revealed the presence of crosslinked Flurolink® MD 700 only on the UV-irradiated (upper) surface of the membrane, not the un-irradiated lower membrane surface. The porosity and nitrogen flux of the composite membrane were nearly unchanged compared to the un-coated Membrane 1. The upper side of the composite membrane gave a water contact angle of 126 degrees, and the water contact angle on the lower side of the membrane remained substantially unchanged. In addition, an increased L.E.P. of 2.5 bar was measured on the upper side of the composite membrane.

Example 2

Another piece of Membrane 1 was first dipped in HFE 7100/Butyl acetate 30/70 v/v solution containing 5% w/w of Fluorolink® AD 1700 and 0.1% w/w Darocur® 1173 (initiator) for 2 minutes, before it was removed from the solution and held horizontally to be dried in a fume hood for 12 hours. Subsequently, the upper side of the dried membrane was irradiated for three times by UV light with a radiation energy of 1.68 J/cm². Finally, it was washed for three times, each with 100 ml of HFE® 7100/Butyl acetate 30/70 solution, to wash out the un-reacted Fluorolink® material from the membrane, and thereby obtaining a composite product (or more specifically, a composite membrane).

FT-IR spectroscopic analyses of the composite membrane revealed the presence of crosslinked Flurolink® AD 1700 only on the UV-irradiated (upper) surface of Membrane 1, not its un-irradiated lower membrane surface. The porosity and the nitrogen flux of the composite membrane were substantially unchanged compared to the un-coated Membrane 1. The upper side of the composite membrane gave a water contact angle of 125 degrees, and the water contact angle on the lower side of the membrane remained substantially unchanged. In addition, an increased L.E.P. of 2.7 bar was measured on the upper side of the composite membrane in Example 2.

Example 3

A piece of Membrane 2 was dipped in HFE 7100/Butyl acetate 30/70 v/v solution containing 5% w/w of Fluorolink® AD 1700 and 0.1% w/w Darocur® 1173 (initiator) for 2 minutes, before it was removed from the solution and held horizontally to be dried in a fume hood for 12 hours. Then, the upper side of the dried membrane was irradiated for ten times by UV light with a radiation energy of 1.68 J/cm². Finally, it was washed for three times, each time with 100 ml of HFE 7100/Butyl acetate 30/70 solution to wash out the un-reacted Fluorolink® material from the membrane, and thereby obtaining a composite product (or more specifically, a composite membrane).

FT-IR spectroscopic analyses of the composite membrane revealed the presence of crosslinked Flurolink® AD 1700 only on the UV-irradiated (upper) surface of the Membrane 2: not on its un-irradiated lower membrane surface. A slightly decreased porosity of 0.70 was measured in the composite membrane, but the nitrogen flux of the composite membrane was substantially unchanged compared to the un-coated Membrane 2. The upper side of the composite membrane gave a large water contact angle of 131 degree, and an increased L.E.P. value of 2.2 bar. In comparison, water readily penetrated the composite membrane from its bottom side, with a drop penetration time of less than 5 seconds—substantially the same as that measured in the un-coated Membrane 2.

Example 4

The same procedure as detailed in Example 3 was followed for a piece of Membrane 3. After the UV irradiation treatment and subsequent solution wash, FT-IR analyses of the treated Membrane 3 revealed the presence of crosslinked Flurolink® AD 1700 only on the UV-irradiated (upper) surface of the membrane: not on its un-irradiated lower surface. A slightly decreased porosity of 0.60 was observed for the composite membrane, whose nitrogen flux was substantially unchanged compared to the un-coated Membrane 3. The upper side of the composite membrane gave a water contact angle of 136 degrees, and an increased L.E.P. value of 2.2 bar. In comparison, water readily penetrated into the composite membrane from its bottom side, with a drop penetration time of less than 5 seconds—substantially the same as that measured in the un-coated Membrane 3.

TABLE 1

Measured parameters of un-treated membranes used in Examples 1-4

|  | Membrane 1 | Membrane 2 | Membrane 3 |
| --- | --- | --- | --- |
| Membrane Material | PES | RC | PVDF |
| Porosity | 0.74 | 0.74 | 0.65 |
| Nitrogen Flux [L/(min · cm$^2$)] | 0.43 | 0.75 | 0.39 |
| L.E.P. (bar) | 0.3 | 0 | 0 |
| Water contact angle (θ) | | | |
| θ at the upper side (°) | 67 | ~0 | ~0 |
| θ at the lower side (°) | 84 | ~0 | ~0 |
| Drop penetration time (d.p.t.) | | | |
| d.p.t at the upper side (s) | n.m.* | <5 | <5 |
| d.p.t at the lower side (s) | n.m.* | <5 | <5 |

*n.m.= not measured

TABLE 2

Measured parameters of composites obtained in Examples 1-4

|  | Ex. 1 | Ex. 2 | Ex. 3 | Ex. 4 |
| --- | --- | --- | --- | --- |
| Un-coated substrate (material) | Membrane 1 (PES) | Membrane 1 (PES) | Membrane 2 (RC) | Membrane 3 (PVDF) |
| Nitrogen Flux [L/(min · cm$^2$)] | 0.40 | 0.41 | 0.75 | 0.39 |
| Porosity | 0.74 | 0.74 | 0.70 | 0.60 |
| L.E.P. (bar) | 2.5 | 2.7 | 2.2 | 2.2 |
| Water contact angle (θ) | | | | |
| θ at the upper side (°) | 126 | 125 | 131 | 136 |
| θ at the lower side (°) | 85 | 83 | ~0 | ~0 |
| Drop penetration time (d.p.t.) | | | | |
| d.p.t at the upper side (s) | n.m.* | n.m.* | n.m.* | n.m.* |
| d.p.t at the lower side (s) | n.m.* | n.m.* | <5 | <5 |

*n.m.= not measured

Example 5

A piece of composite membrane as prepared in Example 1 was immersed in a saline solution (containing NaCl at 3.5% w/w) at 80° C. for 15 days. Afterwards, the composite membrane was removed from saline, repeatedly rinsed in the distilled water, and subsequently dried in a vacuum oven at 40° C. for 24 hours. The nitrogen flux and the L.E.P. value of the thus dried membrane were found to be substantially unchanged, indicating an outstanding thermal stability and physical durability of the composite made according to the present invention.

Example 6

A piece of composite membrane as prepared in Example 2 was immersed in saline solution (containing NaCl at 3.5% w/w) at 80° C. for 15 days. Afterwards, the composite membrane was removed from saline, repeatedly rinsed in the distilled water, and subsequently dried in a vacuum oven for 24 hours at 40° C. The nitrogen flux and the L.E.P. value of the thus dried membrane were found to be substantially unchanged, indicating an outstanding thermal stability and physical durability of the composite made according to the present invention.

Example 7

The same procedure as in Example 5 or 6 was followed in Example 7, for treating a composite membrane as prepared in Example 3. Similarly, the nitrogen flux and the L.E.P. value of the oven dried composite membrane in Example 7 were found to be substantially unchanged compared to the product of Example 3, indicating that the hydrophobic coating provided by the present invention also has an outstanding thermal stability and physical durability when applied on a hydrophilic membrane substrate.

Example 8

The same procedure as in Example 5 or 6 was followed in Example 8, for treating a composite as prepared in Example 4. Similarly, the nitrogen flux and the L.E.P. value of the oven dried membrane in Example 8 were found to be substantially unchanged compared to the product of Example 4, indicating that the hydrophobic coating provided by the present invention also has an outstanding thermal stability and physical durability when applied on a hydrophilic membrane substrate.

Comparative Example 9

A piece of membrane was prepared as in Example 1 except that no UV irradiation was applied to the membrane surface. The membrane porosity and nitrogen flux of the thus obtained membrane were substantially unchanged compared to the un-coated Membrane 1. The thus obtained membrane gave a water contact angle of 70 degrees on its upper side, and 90 degrees on its lower side. In addition, a substantially unchanged L.E.P. of 0.4 bar was measured on the upper side of the membrane obtained in Example 9, much lower than that measured on the upper side of the coated membrane obtained in Example 1.

Without wishing to be bound by the theory, the applicant thinks that in this comparative example, the PFPE moiety could not stay on the membrane surface without the UV irradiation treatment, and was almost completely removed by the washing procedure.

Comparative Example 10

The same procedure as detailed in Example 4 was followed for a piece of Membrane 3 except that, in this case, the upper side of the membrane was irradiated for only once by UV light with a radiation energy of 1.68 J/cm². Nitrogen flux of the thus obtained membrane was substantially unchanged compared to the original Membrane 3. The thus obtained membrane gave an upper side with a relatively large water contact angle of 78 degrees, and a bottom side from where water could readily penetrate the membrane—with a drop penetration time of less than 5 seconds. In addition, a L.E.P. of only 0.2 bar was measured on the upper side of the membrane obtained in Example 10. Without wishing to be bound by the theory the applicant thinks that, in this comparative example, the UV treatment was not enough to guarantee the right hydrophobicity necessary for the application to the membrane.

Example 11

A piece of composite membrane as prepared in Example 2 was tested in a DCMD apparatus which used distilled water as the feed liquid. The feed and the distillate flow rate were respectively set at 230 and 200 L/h; the surface area of the membrane is 40 cm² and its thickness is 65 µm. Three feed temperatures were tested, and at each feed temperature, the test ran for at least 3 hours with no apparent variation in membrane flux. The measured fluxes are reported in Table 3.

Comparative Example 12

A hydrophobic commercial membrane made of polypropylene having a pore size of 0.2 µm and a thickness of 92 µm was tested under the same DCMD conditions as in Example 11. Lower membrane fluxes have been obtained than with the membrane prepared according to Example 2, as shown in Table 3.

TABLE 3

Transmembrane Fluxes Obtained in DCMD

| | Tf [° C.]* | Td [° C.]* | Flux [Kg/m2h] |
|---|---|---|---|
| Ex. 11 | 40.3 | 17.4 | 11.8 |
| | 50.0 | 17.5 | 20.9 |
| | 60.1 | 17.8 | 35.3 |
| Ex. 12 | 40.0 | 17.3 | 6.0 |
| (Comp.) | 50.1 | 17.5 | 12.3 |
| | 59.9 | 17.5 | 20.5 |

*T$_f$ and T$_d$ respectively represent the temperature of the feed and the distillate It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

The invention claimed is:

1. A composite comprising a porous hydrophilic substrate which is a membrane having a nominal pore size in a range of 0.1 µm to 0.5 µm, at least partially coated with a hydrophobic coating layer prepared from curing a coating composition (C), the coating composition (C) comprising at least one curable functional perfluoropolyether compound (E), said compound (E) comprising a (per)fluoropolyalkylene chain ($R_f$) and at least one unsaturated moiety, wherein said chain ($R_f$) complies with formula:

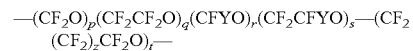

wherein Y is a $C_1$-$C_5$ perfluoro(oxy)alkyl group, z is 1 or 2; and p, q, r, s, t are integers≥0, selected such that the molecular weight of said chain ($R_f$) is more than 500 g/mol and less than 4000 g/mol, wherein the hydrophilic substrate is selected from cellulose, modified PVDF, polysulphone and polyethersulphone.

2. A composite according to claim 1, wherein the coating composition (C) further comprises at least one crosslinking initiator.

3. A composite according to claim 2, wherein the PFPE polymer is radiation curable, and wherein the crosslinking initiator is a photo initiator selected from the group consisting of following families:

alpha-hydroxyketones;

phenylglyoxylates;

benzyldimethyl-ketals;

alpha-aminoketones; and bis acyl-phosphines.

4. A composite according to claim 1, wherein compound (E) is present in an amount in the range of 5% to 100% wt with respect to coating composition (C).

5. A composite according to claim 4, wherein coating composition (C) further comprises at least one nonfluorinated compound (M) having at least one unsaturated moiety, provided that said nonfluorinated compound (M) has at least two unsaturated moieties if compound (E) has one unsaturated moiety.

6. A composite according to claim 4, wherein compound (E) is selected from the group consisting of:

(1) acrylate derivatives of formula:

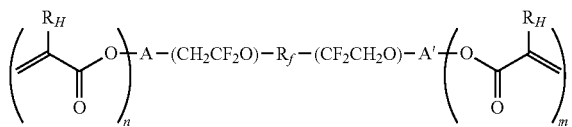

wherein A and A', equal or different from each other, are independently a bond or a divalent, trivalent or tetravalent bonding group; n is 1 when A is a bond or a divalent group, n is 2 when A is a trivalent group, and n is 3 when A is a tetravalent group; m is 1 when A' is a bond or a divalent group, m is 2 when A' is a trivalent group, and m is 3 when A' is a tetravalent group; $R_f$ is a (per)fluoropolyalkylene chain of formula:

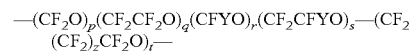

wherein Y is a C1-C5 perfluoro(oxy)alkyl group, z is 1 or 2; and p, q, r, s, t are integers≥0, selected such that the molecular weight of $R_f$ is more than 500 g/mol and less than 4000 g/mol; and $R_H$, $R_{H'}$, equal or different from each other, are independently H or a $C_1$-$C_6$ alkyl group;

(2) acrylamide-urea derivatives of formula:

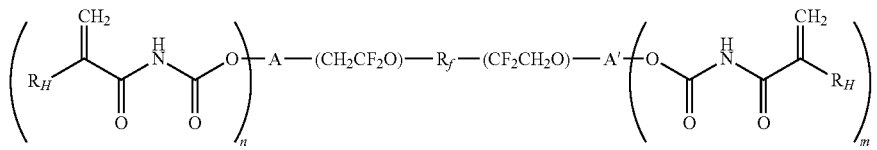

wherein A and A', equal or different from each other, are independently a bond or a divalent, trivalent or tetravalent bonding group; n is 1 when A is a bond or a divalent group, n is 2 when A is a trivalent group, and n is 3 when A is a tetravalent group; m is 1 when A' is a bond or a divalent group, m is 2 when A' is a trivalent group, and m is 3 when A' is a tetravalent group; $R_f$ is a (per)fluoropolyalkylene chain of formula:

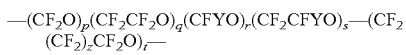

wherein Y is a C1-C5 perfluoro(oxy)alkyl group, z is 1 or 2; and p, q, r, s, t are integers≥0, selected such that the molecular weight of $R_f$ is more than 500 g/mol and less than 4000 g/mol; and $R_H$, $R_{H'}$, equal or different from each other, are independently H or a $C_1$-$C_6$ alkyl group;

(3) acrylate-urethane derivatives of formula:

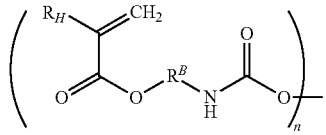

wherein A and A', equal or different from each other, are independently a bond or a divalent, trivalent or tetravalent bonding group; n is 1 when A is a bond or a divalent group, n is 2 when A is a trivalent group, and n is 3 when A is a tetravalent group; m is 1 when A' is a bond or a divalent group, m is 2 when A' is a trivalent group, and m is 3 when A' is a tetravalent group; $R_f$ is a (per)fluoropolyalkylene chain of formula:

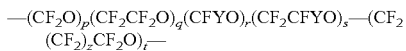

wherein Y is a C1-C5 perfluoro(oxy)alkyl group, z is 1 or 2; and p, q, r, s, t are integers≥0, selected such that the molecular weight of $R_f$ is more than 500 g/mol and less than 4000 g/mol; $R_H$, $R_{H'}$, equal or different from each other, are independently H or a $C_1$-$C_6$ alkyl group; and each of $R^B$, equal to or different from each other, is a divalent, trivalent or tetravalent group selected from the group consisting of $C_1$-$C_{20}$ aliphatic group, $C_5$-$C_{40}$ cycloaliphatic group, $C_6$-$C_{50}$ aromatic, alkylaromatic or heteroaromatic group; and (4) urethane-amide-acrylate derivatives of formula:

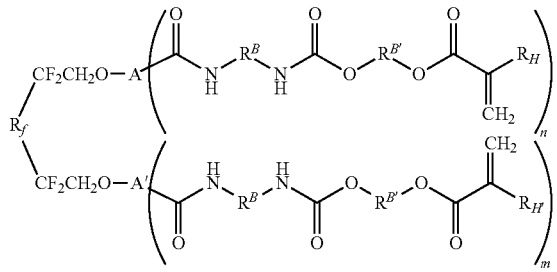

wherein A and A', equal or different from each other, are independently a bond or a divalent, trivalent or tetravalent bonding group; n is 1 when A is a bond or a divalent group, n is 2 when A is a trivalent group, and n is 3 when A is a tetravalent group; m is 1 when A' is a bond or a divalent group, m is 2 when A' is a trivalent group, and m is 3 when A' is a tetravalent group; $R_f$ is a (per)fluoropolyalkylene chain of formula:

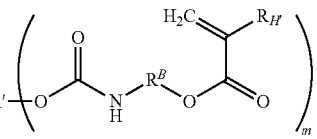

wherein Y is a C1-C5 perfluoro(oxy)alkyl group, z is 1 or 2; and p, q, r, s, t are integers≥0, selected such that the molecular weight of $R_f$ is more than 500 g/mol and less than 4000 g/mol, and $R_H$, $R_{H'}$, equal or different from each other, are independently H or a $C_1$-$C_6$ alkyl group; and each of $R^{B'}$, equal to or different from each other, is a divalent, trivalent or tetravalent group selected from the group consisting of $C_1$-$C_{20}$ aliphatic group, $C_5$-$C_{40}$ cycloaliphatic group, $C_6$-$C_{50}$ aromatic, alkylaromatic or heteroaromatic group.

7. A composite according to claim 4, wherein compound (E) is a compound of formula:

wherein p' and q' are selected so that the molecular weight of chain ($R_f$) is more than 500 and less than 4000.

8. A composite according to claim 4, wherein compound (E) is a compound of formula:

wherein:

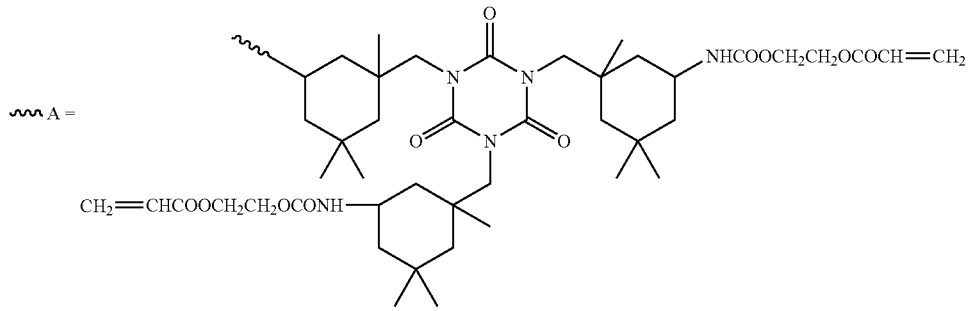

and p' and q' are selected so that the molecular weight of chain ($R_f$) is more than 500 and less than 4000.

9. A process for providing a composite of claim 1, the process comprising:
depositing a coating composition (C) comprising at least one curable compound (E) on a porous membrane; and
curing said coating composition (C) to form a porous membrane at least partially coated with a hydrophobic coating layer.

10. The process according to claim 9, wherein curing said coating composition (C) comprises submitting the coating composition (C) to UV radiation or heating the coating composition (C), to crosslink said PFPE polymer.

11. The process according to claim 9, further comprising:
washing the coated porous substrate with a solvent to remove un-crosslinked PFPE polymer.

12. A method for separating water from aqueous solutions of inorganic solutes, the method comprising contacting the aqueous solution with the composite according to claim 2, wherein the composite comprises a composite membrane.

13. A composite according to claim 7, wherein p' and q' are selected so that the molecular weight of chain ($R_f$) is between 1200 and 3000.

14. A composite according to claim 7, wherein p' and q' are selected so that the molecular weight of chain ($R_f$) is between 1500 and 2500.

15. A composite according to claim 8, wherein p' and q' are selected so that the molecular weight of chain ($R_f$) is between 1200 and 3000.

16. A composite according to claim 8, wherein p' and q' are selected so that the molecular weight of chain ($R_f$) is between 1500 and 2500.

* * * * *